United States Patent [19]

Griffin et al.

[11] Patent Number: 4,998,709
[45] Date of Patent: Mar. 12, 1991

[54] METHOD OF MAKING GRAPHITE ELECTRODE NIPPLE

[75] Inventors: Robert R. Griffin; Keith M. Roussel; Ta-Wei Fu, all of Ponca City, Okla.

[73] Assignee: Conoco Inc., Ponca City, Okla.

[21] Appl. No.: 513,468

[22] Filed: Apr. 19, 1990

Related U.S. Application Data

[63] Continuation-in-part of Ser. No. 210,689, Jun. 23, 1988, abandoned.

[51] Int. Cl.$^5$ ............................................. C01B 31/00
[52] U.S. Cl. .................................. 264/29.5; 264/29.7; 264/105.108; 29/825; 373/92; 403/DIG. 5; 428/408
[58] Field of Search ........................... 29/825; 373/92; 403/266, 267, DIG. 5; 427/228; 428/408; 264/29.5, 29.7, 105, 108

[56] References Cited

U.S. PATENT DOCUMENTS

| | | |
|---|---|---|
| H420 | 2/1988 | Yeager et al. ........................ 264/29.5 |
| 3,550,270 | 12/1970 | Watson, Jr. et al. ................. 29/825 |
| 3,671,385 | 6/1972 | Trent et al. ....................... 264/29.5 X |
| 3,790,393 | 2/1974 | Cowland et al. ............... 264/29.5 X |
| 3,914,395 | 10/1975 | Finelli et al. .................... 264/29.5 X |
| 3,936,535 | 2/1976 | Böder ............................ 264/29.5 X |
| 4,594,722 | 6/1986 | Böder ............................ 403/DIG. 5 |
| 4,777,093 | 10/1988 | Nelson et al. ....................... 428/408 |
| 4,814,307 | 3/1989 | Funabashi et al. ............ 264/29.5 X |

FOREIGN PATENT DOCUMENTS

| | | |
|---|---|---|
| 3124364 | 2/1983 | Fed. Rep. of Germany ...... 428/408 |
| 191057 | 9/1985 | Japan ................................ 428/408 |
| 874619 | 10/1981 | U.S.S.R. ............................ 428/408 |
| 1548046 | 7/1979 | United Kingdom ................. 29/825 |

Primary Examiner—Carl E. Hall
Assistant Examiner—Carl E. Arbes
Attorney, Agent, or Firm—Cleveland R. Williams

[57] ABSTRACT

The present invention resides in improved graphite nipples which are suitable for connecting graphite electrodes. The graphite nipples are prepared by adding mesophase pitch-based carbon fibers into a typical nipple extrusion blend.

6 Claims, No Drawings

METHOD OF MAKING GRAPHITE ELECTRODE NIPPLE

BACKGROUND AND SUMMARY OF THE INVENTION

This application is a continuation-in-part of application Ser. No. 07/210,689, filed June 23, 1988 now abandoned.

The use of carbon and graphite electrodes in electrothermal processes is well established. For example, ultra high power graphite electrodes find particular utility in the manufacture of special alloy steels. The high temperatures needed to melt the metals and other raw materials employed in electrothermal furnaces are obtained by passing an electric current of high amperage as an arc established between the electrodes and the charge. The resultant high temperature arc produces the melting, smelting or other electrothermal action desired.

In the usual furnace operation a series of electrodes are attached one to the other to form a rigid electrode column. As electrodes are consumed in the process the electrode column is maintained in length by attaching thereto additional electrodes.

A method most commonly used to join electrodes into a column for electric furnace applications is an assembly consisting of a graphite threaded male section (nipple) connecting the female ends (sockets) of adjoining electrodes. This assembly is referred to as an electrode joint and there are many arguments in support of its being the best system for this purpose, all factors pertaining to its operation being considered. The graphite nipple, of necessity, has a reduced cross-section compared with the column it supports; hence, it should normally have a higher tensile strength than the balance of the column. However, certain physical properties contributing to increased strength also accentuate other properties such as the thermal expansion. When the diametric thermal expansion of the nipple exceeds that of the electrode sockets which it joins (and in which it is enveloped), severe tensile (or hoop stresses) are developed in the socket walls by the expanding nipple both when the joint is heated and also when the heated joint is suddenly cooled. These stresses may well exceed the tensile strength of the socket material. As a result of this stressed condition, the socket wall often splits with frequent loss of those portions of the column below the split.

It is known in the art that it is desirable to use needle-like (premium) coke in the manufacture of large diameter (such as 18 inch to 28 inch diameter) ultra high power graphite electrodes. The problem of providing satisfactory nipples for such electrodes has assumed considerable proportions. When premium coke is used in the manufacture of such nipples it is desirable that the resulting product differ in certain properties from the joined electrodes. One such property is coefficient of thermal expansion (CTE). As stated in *Electric Furnace Proceedings* (1976) Page 280, "The CTE of an electrode-plus-pin (nipple) combination is critical for the joint fit. Ideally, the best combination is one in which the pin has the higher radial (transverse) CTE and the electrode has the higher longitudinal CTE. Such a combination will develop a tight joint as the electrode becomes hotter. On the other hand, a loose joint and failure will result if the pin has the higher longitudinal CTE and the electrode has the higher radial CTE."

In accordance with this invention an improved graphite nipple is prepared from a typical nipple extrusion blend having incorporated therein carbon fibers. The invention also comprises the preparation of such graphite nipples and premium coke electrode columns in which the electrodes are joined by such nipples. In a preferred embodiment, the carbon fibers are prepared from pitch-based sources, although fibers from any source, such as polyacrylonitrile, can be used. In a most preferred embodiment, the fibers are prepared from mesophase pitches, said fibers having superior CTE.

PRIOR ART

Thomas U.S. Pat. No. 2,969,251 relates to carbon electrode joints, such as nipples which are prepared by mixing together carbon material, such as calcined petroleum coke, graphite or the like with pitch or bituminous material that serves as a binder. Various values of CTE are given in the patent.

Paus et al U.S. Pat. No. 3,540,764 discloses an electrode joint comprising an expanded graphite material located between the mating faces of the electrode. The spacer consists of graphite binder and other materials such as metal, powders or filaments, fibers re-enforcing materials such as fiberglass, clay and the like to strengthen the product and improve its electrical conductivity.

Epstein U.S Pat. No. 4,352,768 relates to a fiber re-enforced cathode for electrochemical cell wherein the carbon cathode comprises graphite, powder, carbon black binder, and carbon fiber additive for re-enforcing the cathode.

DETAILED DESCRIPTION OF THE INVENTION

Graphite electrodes used in electric arc furnaces for the production of steel are normally prepared from needle like or premium grade cokes. The quality of coke, especially premium coke, is often measured by its coefficient of thermal expansion which preferably should not exceed $9 \times 10^{-7}/°C.$ and most preferably $3 \times 10^{-7}/°C.$ on a fine grained flour artifact. The electrodes, however, are prepared from coke which contains a particle size distribution with a maximum size of about ½ inch down to a fine flour of micron size. In a preferred but not critical embodiment, coke particle sizes are from 10 to 50 percent by weight +20 mesh, and at least 20 weight percent of the particles will be less than 40 mesh. The particle size distribution and structure of the petroleum coke raw material in the electrode are substantially retained through the electrode manufacturing process. The resulting graphitized specimens can be examined by microscopic methods so that the final graphite product can in part be characterized by the particle size distribution and structure of the raw material.

In carrying out the electrode and/or graphite nipple manufacturing process herein, subdivided petroleum coke which has been calcined is mixed with a binder, typically a coal-tar pitch, and a small percentage of iron oxide. The iron oxide is used to control the "puffing" of high sulfur petroleum coke during the subsequent electrode graphitization process. Small amounts of viscous petroleum oil may be added to the mixture as a lubricant. The mixture of coke, pitch and iron oxide is extruded at temperatures near the softening point of the pitch to form green electrodes or carbon nipples of approximately the required finished dimensions. Usually the electrodes are from about 18 to about 28 inches in diameter and may be of varying lengths and the nipples which are machined from graphitized artifacts are usually about 8 to 12 inches in diameter.

A green electrode is baked at a temperature from about 1,000° F. (538° C.) to about 2,000° F. (1,093° C.) preferably from about 1,400° F. (760° C.) to about 1,800° F. (982° C.) during which the binder is carbonized to form a rigid body. Generally, residence times of from about 2 weeks to about 5 weeks are employed in the baking process. Subsequent to the baking process, the electrode may be impregnated with an impregnating pitch and rebaked to eventually provide an electrode or carbon nipple having a higher density and strength and lower electrical resistivity.

Although coal-tar pitch is the preferred binder, other pitches may be used such as petroleum pitches, natural asphalt and heavy oil obtained as a by-product in the naptha cracking industry, pitches of high carbon content obtained from petroleum asphalt and other substances having properties of pitches produced as by-products in various industrial production processes. In addition mesophase pitches may be employed. "Mesophase" is an art term and is synonymous with liquid crystal, that is a state of matter, which is intermediate between crystalline solid and an isotropic liquid.

The final process step is that of graphitization. Baked carbon electrodes and/or carbon nipple artifacts are packed in furnaces surrounded by insulating materials and heated to temperatures up to 5400° F. (2,982° C.), especially from about 4,900° F. (2,704° C.) to about 5,400° F. (2,982° C.) for a period of time sufficient to graphitize the electrodes or carbon nipple artifacts. These temperatures are necessary to convert the amorphous carbon in the electrodes and nipple artifacts to the crystalline graphitic state. Residence times of from about 5 days to about 14 days are generally sufficient to convert the carbon electrodes to the graphite state.

The graphite artifact from which the nipples of this invention are produced are processed in a manner similar to the electrodes herein up to the steps of mixing subdivided premium (calcined) coke with a carbonaceous binder and iron oxide to form an extrusion blend. The major difference in the preparation of the nipple artifacts as compared to the before mentioned electrodes is the addition of carbon fibers prepared from mesophase pitch to the extrusion blend prior to extrusion. The composition of the raw material used in the preparation of the nipple artifacts is usually between about 40 and about 72 weight percent, preferably from about 45 to about 65 weight percent premium coke, between about 5 and about 25 weight percent, preferably from about 8 to about 20 weight percent carbon fibers prepared from mesophase pitch, between about 20 and about 30 weight percent, preferably between about 22 and about 28 weight percent binder, and between about 0 and about 3 percent, especially from about 0.01 to about 2.5 weight percent iron oxide. If present, the optional petroleum lubricant can constitute up to about 5 percent by weight, preferably from about 0.01 to about 4 weight percent of the raw material.

After graphitization, the artifact is machined to form the desired nipple product which is usually tapered from the middle to each end and threaded. To accommodate the nipple, electrodes are drilled at each end and shaped and threaded to receive the nipple.

The carbon fibers which are used in the extrusion blend of the nipple artifacts of the invention are prepared from pitches. Suitable feedstocks for the preparation of mesophase pitches which are precursors for the carbon fibers herein include such materials as heavy aromatic petroleum streams, ethylene cracker tars, coal derivatives, petroleum thermal tars, fluid catalytic cracker residues and aromatic distillates having a boiling range from 650° F. to 950° F. Mesophase pitch herein is conveniently formed by heat-soaking the carbonaceous feedstock at a temperature of from about 350° C. to about 500° C. for from about 1 hour to about 30 hours. Normally the heat soaking step takes place utilizing an inert atmosphere for example nitrogen gas. Air, oxygen or some other oxygenating gas may be bubbled through the carbonaceous feedstock to enhance the formation of mesophase pitch. During the heat soak stage, a portion of the carbonaceous feedstock, e.g., mesogens, combine and form a separate mesophase pitch within the carbonaceous feedstock. The mesophase pitch thus produced is an anisotropic pitch which comprises molecules having aromatic structures which through interaction have associated together to form optically ordered liquid crystals, which are aligned in a particular manner during the heat soak step and may be observed using an optical microscope using polarized light.

The mesophase pitch thus produced has a softening point of less than 350° C. The softening point of the mesophase pitch is determined using either the Mettler softening point procedure, e.g., widely accepted as the standard for evaluating precursor pitches, or by hot stage microscopy. Utilizing the hot stage microscopy method, mesophase pitch is heated on a microscope hot stage in an inert atmosphere under polarized light. The mesophase pitch temperature is increased at a controlled rate until the mesophase pitch commences to deform. The temperature at which the mesophase pitch starts to deform is noted as the softening temperature. The mesophase pitch herein preferably has a softening point of below about 350° C. herein, because above this temperature the mesophase pitch cannot be spun into carbon fibers having the desired physical and chemical properties for enhancing the properties of graphite nipples.

In the carbon fiber production process, the mesophase pitch is spun into fiber filaments which are oxidatively stabilized at an elevated temperature, e.g., 350° C. followed by heat treatment in an inert atmosphere at temperatures of 1800° C. or higher. Carbon fibers useful in the present invention can vary in diameter and in length. Usually the diameter of the fibers is between about 3 and about 20 microns. The fibers may be cut into convenient lengths from $\frac{1}{8}$ inch to 2 inches or longer prior to use. The fibers are coextended with the coke and are of random lengths in the coke as a result of the actions of the extender on the fibers. The fibers are substantially oriented by the extruder to provide the desirable CTE effects described.

In a preferred mode, the carbon fibers herein after graphitization have a tensile strength greater than $200 \times 10^3$ psi, preferably from about $200 \times 10^3$ psi to about $300 \times 10^3$ psi; a Young's modulus of elasticity greater than $55 \times 10^6$ psi, preferably from about $55 \times 10^6$ psi to about $120 \times 10^6$ psi and an electrical resistivity less than $250 \times 10^6$ ohm centimeters.

Carbon fibers prepared from mesophase pitch have zero or negative values of longitudinal CTE and are preferred. The use of such carbon fibers provides nipples in which the longitudinal CTE is reduced over that which would be obtained from premium coke alone and the transverse CTE is increased over the CTE provided by premium coke.

As used hereinafter the term "mesophase carbon fibers" means carbon fibers prepared from mesophase-containing pitch, said fibers having a zero or negative longitudinal CTE.

The mesophase pitch is melt spun to form fibers, oxidized to cross-link and thus prevent them from re-melting and carbonized. The fibers in their as-spun state are noncrystalline but highly oriented, with the molecular layer planes lining up along the fiber axis. The full-width at half-maximum of the distribution of orientations of aromatic molecules along the fiber axis is approximately 25° to 30° wherein approximately ¾ of the layered planes lie within an angle of ±15° of the fiber axis. It should be noted that celulose-based carbon fibers, such as rayon or polyacrylonitrile, have to be hot stretched above 3,500° C. to obtain a remotely similar pattern.

Because of the highly oriented and organized structure of the as-spun carbon fibers, they are capable of being thermally graphitized and of achieving extremely high moduli approaching the theoretical limit of graphite (e.g., approximately $1 \times 10^6$ $MP_a$) without any high temperature stretching.

In the process of preparing the graphite nipples herein, the addition of mesophase carbon fibers reduces the longitudinal CTE of the nipple and increases the transverse CTE, as compared to the values which would be obtained from the use of premium coke alone. The exact amount of decrease in longitudinal CTE and increase in transverse CTE will depend on the properties of the premium coke and the properties of the as-spun carbon fiber used.

The procedures followed and the conditions employed for the manufacture of carbon fibers are known techniques and consequently they do not constitute a critical feature of the present invention. Carbon fibers from pitch, whether petroleum or coal-based, or from the polyacrylonitrile carbonization process can be used. However, fibers from pitch containing mesophase pitch are preferred based on cost-efficiency and properties. A general disclosure of carbon fiber manufacturing techniques is contained in Singer U.S. Pat No. 4,005,183, which is incorporated herein by reference.

The following example more correctly describes the present invention. The example is provided to illustrate the invention and not to limit it.

EXAMPLE

The premium grade coke used in the example was a commercial production coke having a ¾" diameter electrode longitudinal CTE of $1.5 \times 10^{-7}$/°C. on a flour specimen. Green electrodes were extruded from a 70 millimeter diameter extruder, baked, and subsequently graphitized. The coke formulation of the base case and the carbon fiber case contained 25 weight percent $8 \times 16$ mesh particles, 25 percent $20 \times 40$ mesh particles and 50 weight percent flour ($-100$ mesh particles). The flour was further divided into 50 weight percent $100 \times 200$ mesh particles and 50 weight percent $-200$ mesh particles. The binder pitch was a coal-tar pitch supplied by Allied Chemical Company (No. 30 medium). The mesophase carbon fibers used in the example were a commercially available spool fiber (P55) supplied by Union Carbide Corporation. The Union Carbide fiber is described in *Fuel,* Volume 60, Number 9, Page 839 to 847, September 1981, which is incorporated herein by reference. The P55 mesophase carbon fibers had a CTE of $-0.9 \times 10^{-6}$/°C. and a diameter of between 8 and 12 microns. The fibers were cut into 2 inch long sections and incorporated into the extrusion blend. The compositions and the properties of the extruded blends with and without mesophase carbon fiber are shown in the following table.

TABLE

ELECTRODE NIPPLE PROPERTIES

| Blend Composition | $CTE_L$ $\times 10^{-7}$/°C. | $CTE_T$ $\times 10^{-7}$/°C. | Apparent Density g/cc | Electrical Resistivity $\times 10^{-4}$ in-ohm | Modulus of Rupture psi |
|---|---|---|---|---|---|
| Base Case | 4.3 | 20.6 | 1.62 | 3.25 | 1340 |
| 76% Premium Coke | | | | | |
| 22% Coal-Tar Pitch | | | | | |
| 1.5% Iron Oxide | | | | | |
| 0.5% Lubricant | | | | | |
| With Mesophase Carbon Fiber Added | 1.3 | 21.4 | 1.60 | 3.57 | 1156 |
| 63% Premium Coke | | | | | |
| 22% Coal-Tar Pitch | | | | | |
| 1.5% Iron Oxide | | | | | |
| 0.5% Lubricant | | | | | |
| 13% Carbon Fibers | | | | | |

As shown in the Table the addition of 13 weight percent mesophase carbon fiber decreased the longitudinal CTE from $4.3 \times 10^{-7}$/°C. to $1.3 \times 10^{-7}$/°C., increased the transverse CTE from $20.6 \times 10^{-7}$/°C. to $21.4 \times 10^{-7}$/°C. and maintained the density, electrical resistivity and strength levels of the base case. The visual appearance and texture of the base case and mesophase carbon fiber electrodes are virtually identical.

We claim:

1. A process for producing graphite nipples suitable for connecting graphite electrodes which comprises the steps of:
   (a) adding from about 8 weight percent to about 20 weight percent of carbon fibers produced from spun mesophase pitch to from about 45 weight percent to about 65 weight percent of premium coke and from about 22 weight percent to about 28 weight percent of a binder to form an extrusion blend,
   (b) extruding the extrusion blend to form an elongated carbon nipple, (c) subjecting the carbon nipple to a temperature of from about 760° C. to about 982° C. for from about 2 weeks to about 5 weeks to produce a baked carbon nipple; and (d) subjecting the baked carbon nipple to a temperature above about 2,704° C. from about 5 days to about 14 days to produce a graphite nipple.

2. The process according to claim 1 wherein the mesophase pitch used to produce carbon fibers has a melting point below 350° C.

3. The process according to claim 1 including adding from about 0.01 weight percent to about 2.5 weight percent of iron oxide to the extrusion blend.

4. The process of claim 1, including adding from about 0.01 to about 4 weight percent of a lubricant to the extrusion blend.

5. The process according to claim 1, wherein the graphitized carbon fibers of the graphite nipples have a tensile strength of from about $200 \times 10^3$ psi to about $300 \times 10^3$ psi.

6. The process according to claim 1, wherein the graphitized carbon fibers of the graphite nipple have a Youngs modulus of elasticity of from about $55 \times 10^6$ psi to about $120 \times 10^6$ psi.

* * * * *